United States Patent
Horii et al.

(10) Patent No.: US 6,778,892 B2
(45) Date of Patent: Aug. 17, 2004

(54) VEHICLE HEADLAMP OPTICAL AXIS CONTROL SYSTEM

(75) Inventors: Yasutoshi Horii, Nagoya (JP); Takamichi Nakase, Gamagori (JP)

(73) Assignee: Denso Corporation, Kariya (JP)

(*) Notice: Subject to any disclaimer, the term of this patent is extended or adjusted under 35 U.S.C. 154(b) by 35 days.

(21) Appl. No.: 10/230,410

(22) Filed: Aug. 29, 2002

(65) Prior Publication Data

US 2003/0055548 A1 Mar. 20, 2003

(30) Foreign Application Priority Data

Aug. 31, 2001 (JP) ........................... 2001-263077

(51) Int. Cl.$^7$ ............................ G06F 7/00; B60Q 1/00
(52) U.S. Cl. ................ 701/49; 362/464; 362/466.4; 362/44; 340/468; 307/10.8; 315/81; 315/82
(58) Field of Search ............................ 340/458, 463, 340/468, 469, 471, 472; 315/76–77, 80–82; 385/39, 901; 307/9.1, 10.1, 10.8; 362/37, 39, 44, 459, 496, 40, 41, 43, 460, 464, 467, 465, 466, 469, 551; 701/49–56

(56) References Cited

U.S. PATENT DOCUMENTS

| | | | | |
|---|---|---|---|---|
| 5,488,545 A | * | 1/1996 | Kato et al. | 362/551 |
| 5,601,354 A | * | 2/1997 | Horii et al. | 362/551 |
| 5,660,454 A | * | 8/1997 | Mori et al. | 362/466 |
| 6,049,749 A | | 4/2000 | Kobayashi | 701/49 |
| 6,481,876 B2 | * | 11/2002 | Hayami et al. | 362/464 |
| 6,626,564 B2 | * | 9/2003 | Horii et al. | 362/466 |

FOREIGN PATENT DOCUMENTS

JP    B2-2950897    7/1999

* cited by examiner

Primary Examiner—Jacques H. Louis-Jacques
(74) Attorney, Agent, or Firm—Posz & Bethards, PLC

(57) ABSTRACT

A lamp's optical axis control system for a vehicle includes vehicle speed sensor, steering angle sensor, a circuit for calculating driver's viewpoint and a controller for controlling the optical axis according to the position of the driver's view point. The controller indicates the position of the driver's viewpoint a certain time in advance according to the vehicle speed signal and the steering angle signal. Therefore, the illumination range of the headlamps can timely provides a desirable driver's view point.

7 Claims, 5 Drawing Sheets

VEHICLE HEADLAMP OPTICAL AXIS CONTROL SYSTEM

CROSS REFERENCE TO RELATED APPLICATION

The present application is based on and claims priority from Japanese Patent Application 2001-263077, filed Aug. 31, 2001, the contents of which are incorporated herein by reference.

BACKGROUND OF THE INVENTION

1. Field of the Invention

The present invention relates to a headlamp's optical axis control system for a vehicle.

2. Description of the Related Art

In a headlamp's optical axis control system, such as disclosed in JP-B-2950897, the headlamp's optical axis is controlled to swivel right or left according to the steering angle of a steering wheel. In such a control system, a dead zone is provided at the neutral position of the steering wheel to prevent fluctuation of the optical axis due to play of the steering wheel or due to a minute operation of the steering wheel. Although the optical axis of the head lamp of a car is controlled according to the vehicle speed and steering angle of the steering wheel, a driver may have difficulty when he or she wants to watch an object while driving the car at a curve because the illumination range of the head lamps may not always illuminate the object.

SUMMARY OF THE INVENTION

The present invention has been made in view of the above-stated problem.

It is an object of the invention to provide a headlamp's optical axis control system for a vehicle that can illuminate the object that a driver wants to watch.

According to a feature of the invention, a head lamp's optical axis control system for a vehicle includes vehicle speed detecting means, steering angle detecting means, driver's viewpoint calculating means for providing position of a driver's viewpoint that comes a predetermined time in advance according to the vehicle speed and the steering angle, and control means for controlling the optical axis so that the illumination range covers the driver's viewpoint. Preferably the control means includes a map and correction means are provided. The map provides standard positions of the driver's view points that correspond to various vehicle speeds and steering angles, and the correcting means corrects the standard position of the driver's viewpoint by multiplying the standard position by a prescribed coefficient proportional to the vehicle speed or steering angle if the vehicle speed or the steering angle is different from the speed or steering angle that corresponds to the standard position.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
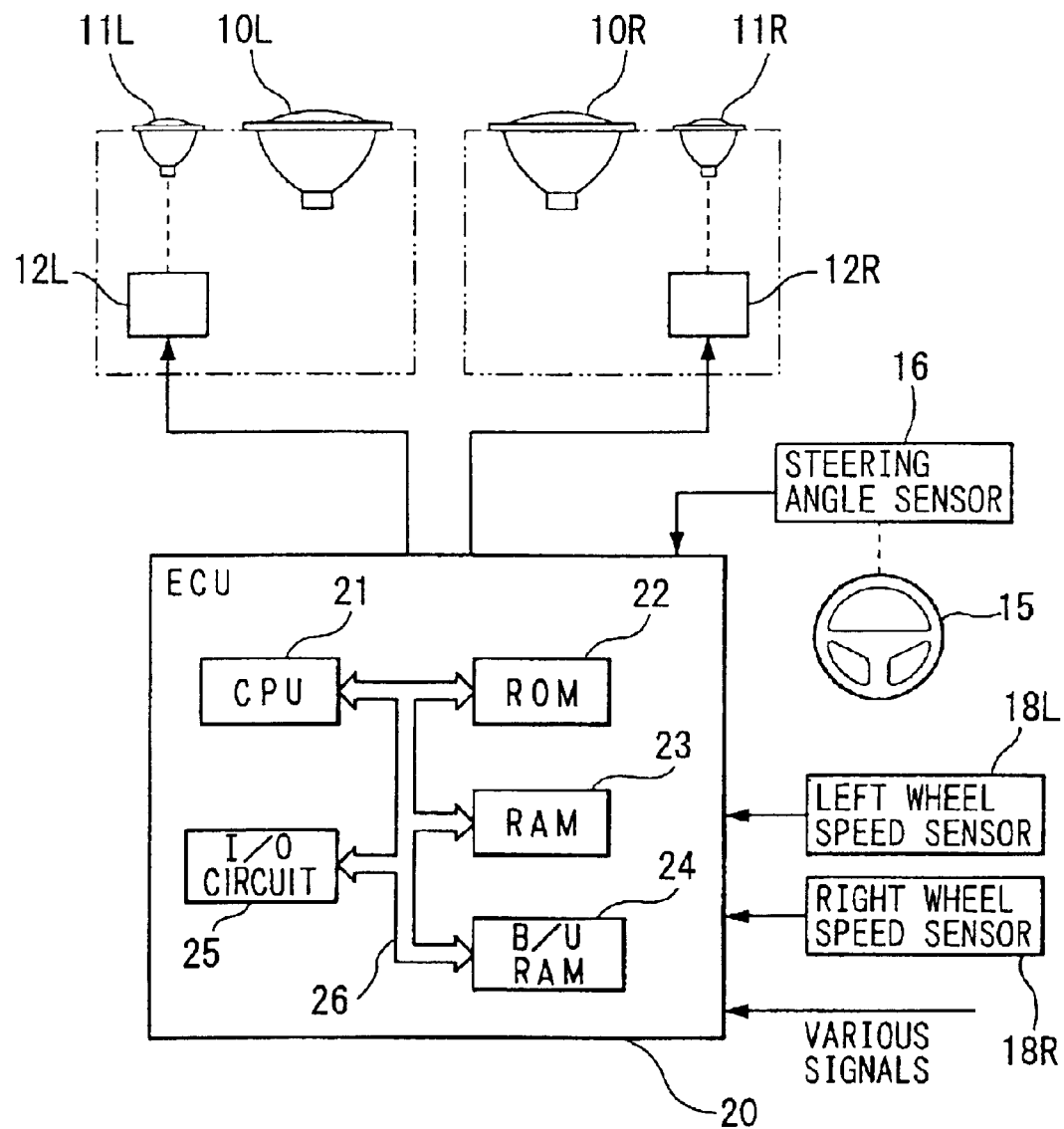
FIG. 1 is a schematic diagram illustrating a vehicle headlamp's optical axis control system according to a preferred embodiment of the invention.
Figure 2:
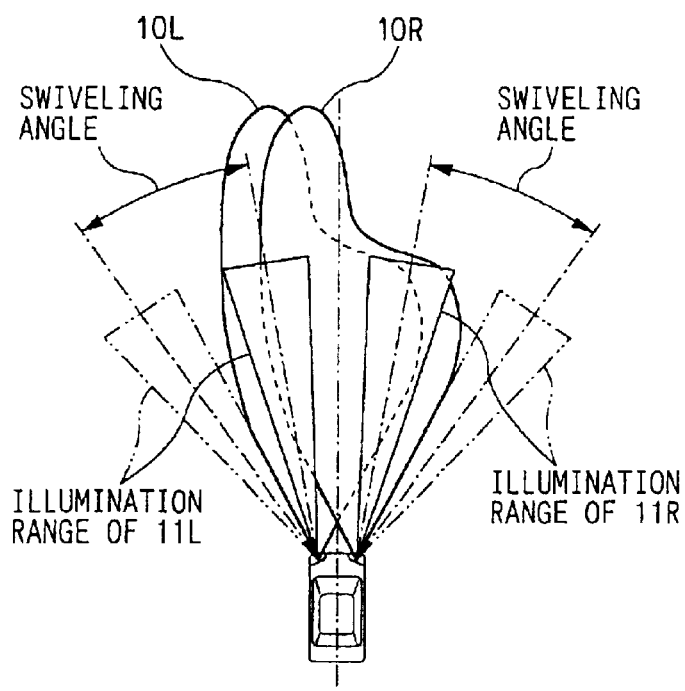
FIG. 2 illustrates illumination ranges formed by fixed lamps and swiveling lamps that are controlled by the headlamp's optical axis control system according to the preferred embodiment of the invention.

As shown in FIG. 1, a vehicle is equipped with right and left headlamps 10R, 10L, right and left swiveling lamps 11R, 11L, their swiveling actuators 12R, 12L, a steering wheel 15, a steering angle sensor 16, right and left wheel speed sensors 18R, 18L, and an electronic control unit (ECU) 20.

The steering angle sensor 16 detects steering angle $\theta s$ of the steering wheel 15 measured from the neutral position thereof. The ECU 20 includes a central processor unit (CPU) 21, a ROM 22, a RAM 23, a back-up RAM 24, I/O circuit 25, bus lines 26, etc. The ROM 22 includes a map that provides standard swivel angles $\theta sw$, which is determined based on a vehicle speed V and a steering angle $\theta s$, as described below in more detail with reference to FIG. 6. The ECU 20 connects with swiveling actuators 12R, 12L, the steering angle sensor 16, the wheel speed sensors 18R, 18L and various sensors.

The ECU 20 calculates a driver's viewpoint a predetermined time in advance based on the vehicle speed V detected by the wheel speed sensors 18R, 18L and the steering angle $\theta s$ detected by the steering angle sensor 16. The ECU 20 controls the swiveling actuators 12R, 12L according to the standard swivel angle $\theta sw$ provided by the map that corresponds to the vehicle speed V and the steering angle $\theta s$, thereby to swivel the optical axis of the swiveling lamps 11R, 11L so that the driver's viewpoint can be covered by the illumination range of the swiveling lamps 11R, 11L.

Figure 3:
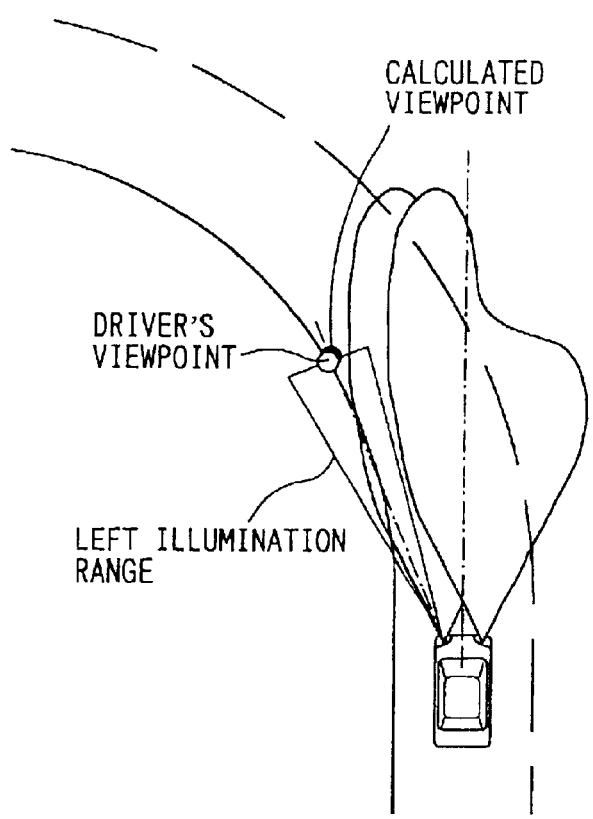
FIG. 3 illustrates an example of the operation of the headlamp's optical axis control system according to the preferred embodiment of the invention while driving at a curve at a certain speed.
Figure 4:
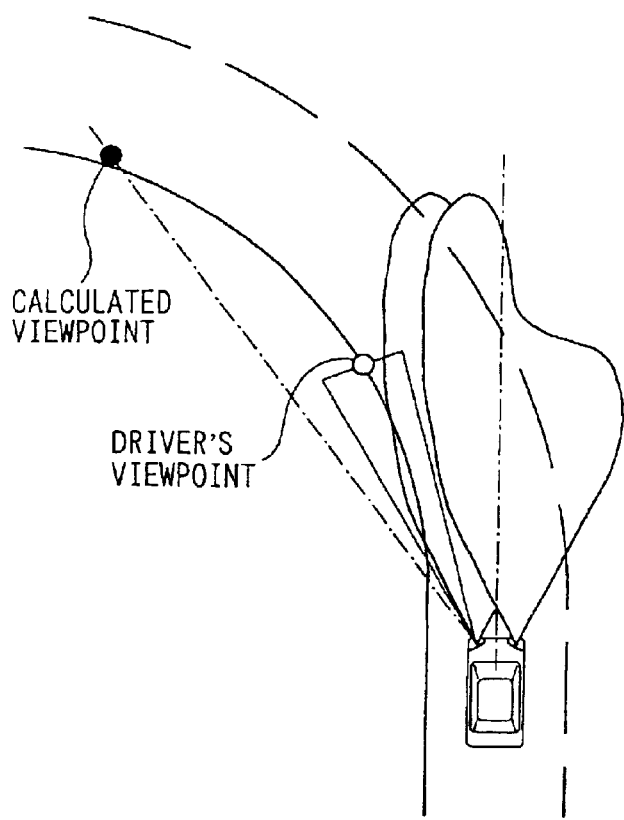
FIG. 4 illustrates an example of the operation of the headlamp's optical axis control system according to the preferred embodiment of the invention while driving at a curve at a speed that is twice as high as the certain speed.
Figure 5:
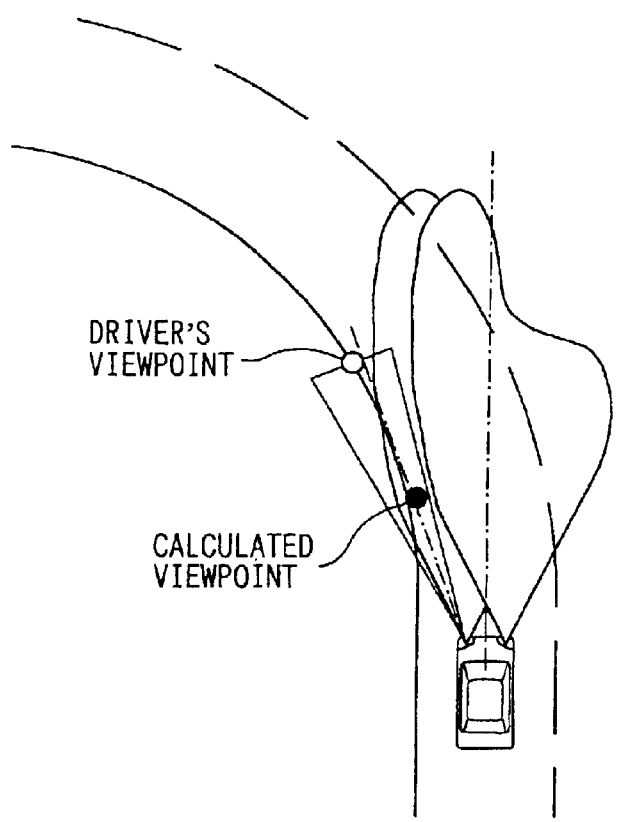
FIG. 5 illustrates an example of the operation of the headlamp's optical axis control system according to the preferred embodiment of the invention while driving at a curve at a speed that is half of the certain speed.
Figure 6:
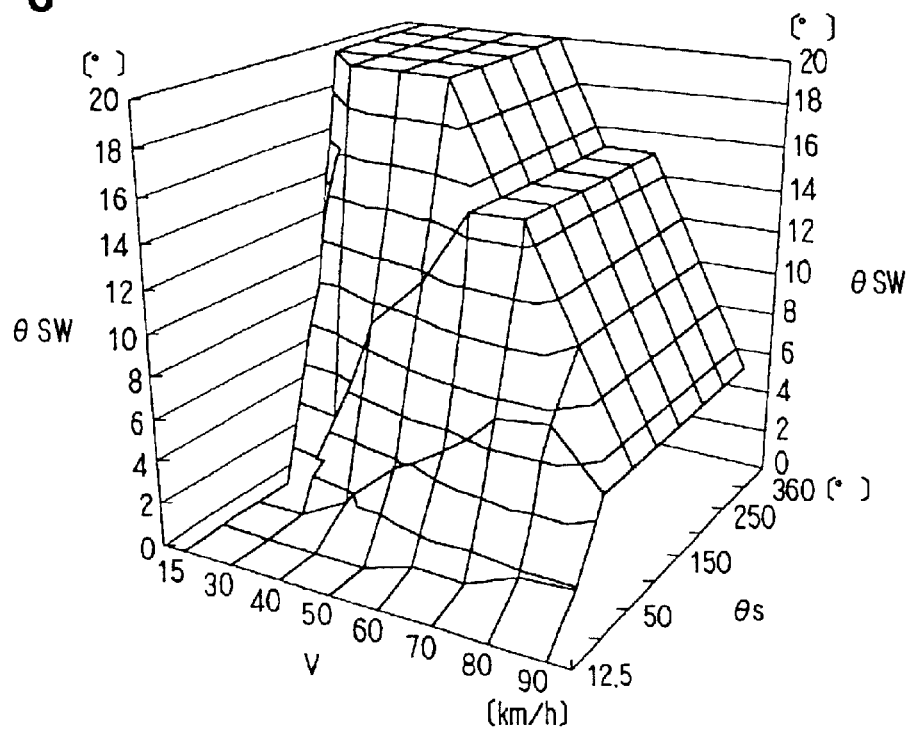
FIG. 6 is a schematic diagram showing a three-dimensional map of the headlamp's optical axis control system according to the preferred embodiment of the invention.

When the vehicle passes a curve at a standard speed, one (e.g. left lamp 11L while turning left) of the swiveling lamps 11R, 11L is controlled according to the map shown in FIG. 6 to swivel right or left so that the illumination range of the left swiveling lamp 11 L can cover a driver's view point (white circle), as shown in FIG. 3. In this case the calculated viewpoint (dark circle) from the map overlaps a desirable driver's viewpoint.

When the vehicle runs at the speed that is twice as high as the standard speed, the calculated viewpoint (dark circle) is located twice as distant as the driver's viewpoint. Therefore, it is not possible for the swiveling lamp to cover such a long distance. In this case, the swivel angle of the optical axis of the swiveling lamp 11L is corrected by multiplying the standard swivel angle θsw by ½ so that the illumination range of the swiveling lamp can cover the driver's view point.

When the vehicle runs at a half of the standard speed, the calculated viewpoint at the standard speed is located at as half a distance as the driver's viewpoint. In this case, the swivel angle of the optical axis of the swiveling lamp 11L is corrected by multiplying the standard swivel angle θsw by 2 so that the illumination range of the swiveling lamp can cover a range that is twice as long as the calculated viewpoint. As a result, the distance of the driver's viewpoint can be increased to double the calculated viewpoint.

Figure 7:
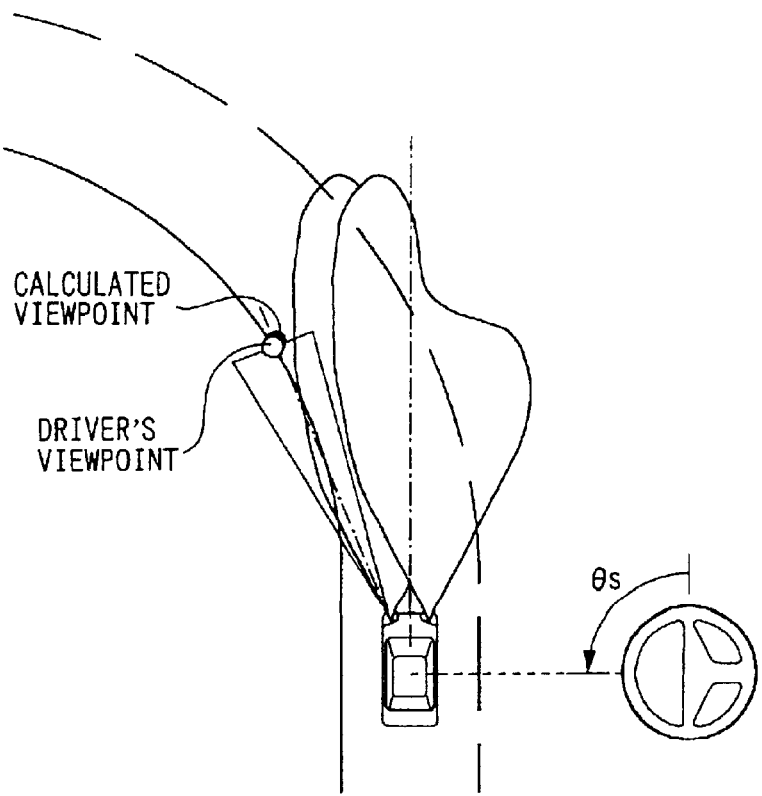
FIG. 7 illustrates an example of the operation of the headlamp's optical axis control system according to the preferred embodiment of the invention while driving at a curve with a certain steering angle.

FIG. 7 shows a standard illumination range when the driver turns the steering wheel 15 by standard steering angle θs while passing a left turn curve. In this case the driver's viewpoint (white circle) and the calculated viewpoint (dark circle) overlap each other.

Figure 8:
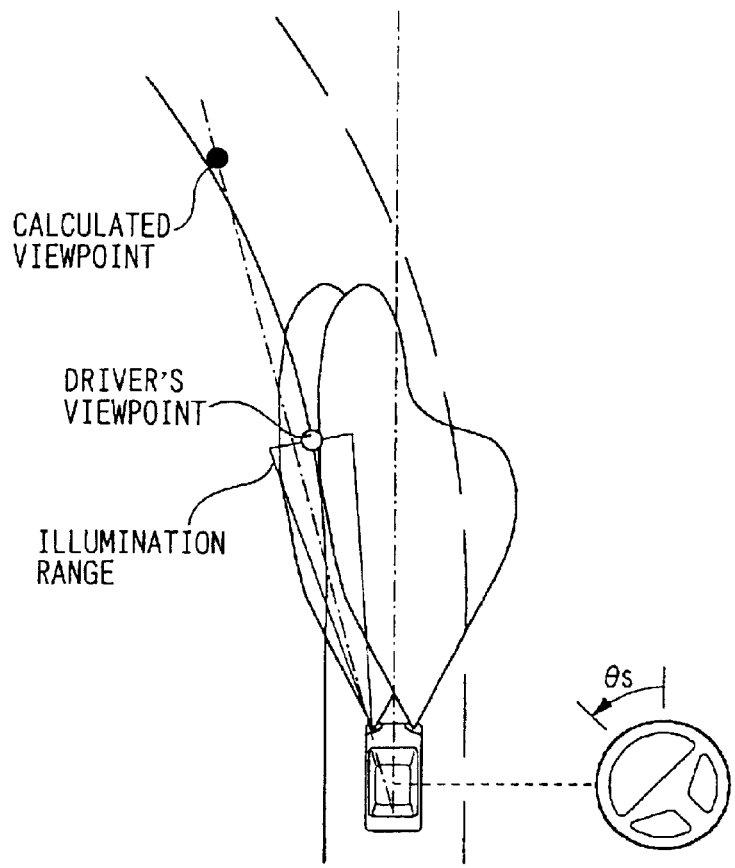
FIG. 8 illustrates an example of the operation of the headlamp's optical axis control system according to the preferred embodiment of the invention while driving at a curve with a steering angle that is a half as large as the certain steering angle.

When the vehicle passes a left turn curve that has a twice as large turning-radius as the left turn curve shown in FIG. 7, the driver turns the steering wheel by an angle θs that is a half of the standard steering angle. In this case, the map provides a standard swiveling θsw that is the angle for the vehicle running at a speed twice as high as the standard speed. Therefore, the standard swiveling angle θsw is multiplied by 2 to provide a corrected swiveling angle, as shown in FIG. 8.

Figure 9:
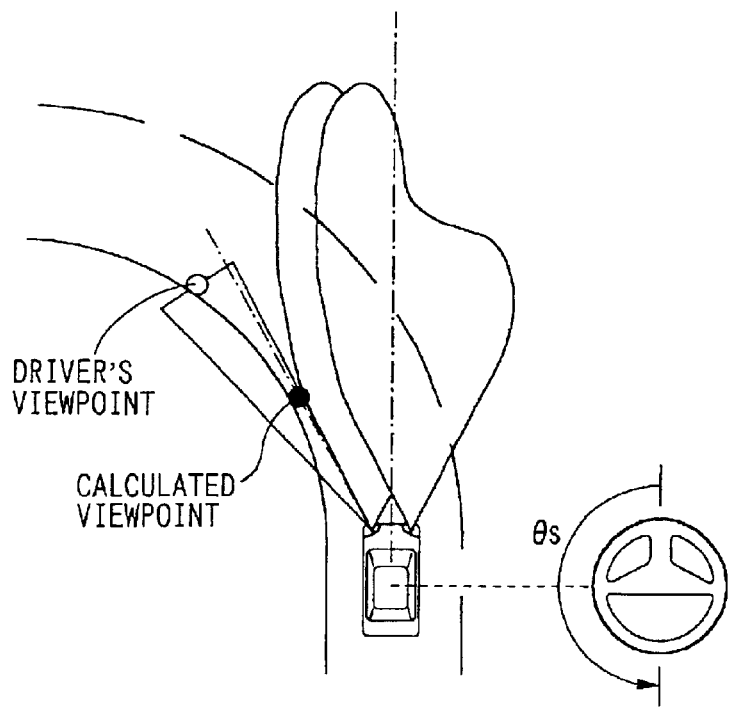
FIG. 9 illustrates an example of the operation of the headlamp's optical axis control system according to the preferred embodiment of the invention while driving at a curve with a steering angle that is twice as large as the certain steering angle.

When the vehicle passes a left turn curve that has a half as large turning-radius as the left turn curve shown in FIG. 7, the driver turns the steering wheel by an angle θs that is double the standard steering angle. In this case, the map provides a standard swiveling θsw that is the angle for the vehicle running at a half of the standard speed. Therefore, the standard swiveling angle θsw is multiplied by ½ to provide a corrected swiveling angle, as shown in FIG. 9.

If the steering angle or the vehicle speed changes while turning a curve, correction may be made by multiplying the swiveling angle by a coefficient that is proportional to a change in angle or a change in vehicle speed in a similar manner as described above.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A lamp optical axis control system for a vehicle having a lamp with an optical axis for providing an illumination range in front of the vehicle, said control system comprising:
   vehicle speed detecting means for detecting a vehicle speed;
   steering angle detecting means for detecting a steering angle of a steering wheel;
   driver's viewpoint calculating means for providing a position of a driver's viewpoint a predetermined time in advance according to the vehicle speed and the steering angle, wherein said driver's view point calculating means comprises:
      a map for providing standard positions of the driver's view points that correspond to vehicle speeds and steering angles; and
      correcting means for correcting the standard position of said driver's viewpoint by multiplying said standard position by a prescribed coefficient proportional to the vehicle speed if the vehicle speed is different from said standard vehicle speed; and
   control means for controlling said optical axis according to the future position of the driver's view point, thereby moving said illumination range to cover said driver's viewpoint.

2. A lamp optical axis control system for a vehicle having a lamp with an optical axis for providing an illumination range in front of the vehicle, said control system comprising:
   vehicle speed detecting means for detecting a vehicle speed;
   steering angle detecting means for detecting a steering angle of a steering wheel;
   driver's viewpoint calculating means for providing a position of a driver's viewpoint a predetermined time in advance according to the vehicle speed and the steering angle, wherein said driver's view point calculating means comprises:
      a map for providing standard positions of the driver's view points that correspond to vehicle speeds and standard steering angles; and
      correcting means for correcting the standard position of said driver's viewpoint by multiplying said standard position by a prescribed coefficient proportional to steering angle if the steering angle is different from said standard steering angle; and
   control means for controlling said optical axis according to the future position of the driver's view point, thereby moving said illumination range to cover said driver's viewpoint.

3. A lamp optical axis control system for a vehicle having a lamp with an optical axis for providing an illumination range in front of the vehicle, said control system comprising:
   vehicle speed detecting means for detecting a vehicle speed;
   steering angle detecting means for detecting a steering angle of a steering wheel;
   driver's viewpoint calculating means for providing a position of a driver's viewpoint a predetermined time in advance according to the vehicle speed and the steering angle, wherein said driver's view point calculating means comprises:
      a map for providing standard positions of the drivers' view points that correspond to vehicle speeds and steering angles; and
      correcting means for correcting the standard position of said driver's viewpoint by multiplying a prescribed control coefficient that is a function of a change of the vehicle speed; and
   control means for controlling said optical axis according to the future position of the driver's view point, thereby moving said illumination range to cover said driver's viewpoint.

4. A lamp optical axis control system for a vehicle having a lamp with an optical axis for providing an illumination range in front of the vehicle, said control system comprising:

vehicle speed detecting means for detecting a vehicle speed;

steering angle detecting means for detecting a steering angle of a steering wheel;

driver's viewpoint calculating means for providing a position of a driver's viewpoint a predetermined time in advance according to the vehicle speed and the steering angle, wherein said driver's view point calculating means comprises:

a map for providing standard positions of the driver's view points that correspond to vehicle speeds and steering angles;

and correcting means for correcting the standard position of said driver's viewpoint by multiplying a prescribed control coefficient that is a function of a change of the steering angle; and control means for controlling said optical axis according to the future position of the driver's view point, thereby move said illumination range to cover said driver's viewpoint.

5. A lamp optical axis control system for a vehicle having a lamp with an optical axis for providing an illumination range in front of the vehicle, said control system comprising:

vehicle speed detecting means for detecting a vehicle speed;

steering angle detecting means for detecting a steering angle of a steering wheel;

a map for providing a standard viewpoint a predetermined time in advance by a standard swiveling angle of the optical axis and a standard distance according to a vehicle speed and a steering angle;

correcting means for correcting the standard swiveling angle to provide a desired viewpoint covered by the illumination range; and control means for controlling the optical axis according to the corrected swiveling angle.

6. The lamp optical axis control system as claimed in claim 5, wherein said correction means multiplies said swiveling angle by a prescribed coefficient proportional to a detected vehicle speed if the vehicle speed is different from the standard vehicle speed.

7. The lamp optical axis control system as claimed in claim 5, wherein said correcting means multiplies said swiveling angle by a prescribed coefficient proportional to the steering angle if the steering angle is different from said standard steering angle.

\* \* \* \* \*